(12) United States Patent
Pak et al.

(10) Patent No.: US 6,461,522 B1
(45) Date of Patent: Oct. 8, 2002

(54) WASTEWATER TREATMENT BY CATALYTIC OXIDATION

(75) Inventors: Dae-Won Pak, Seoul (KR); Won-Seok Chang, Seoul (KR); Sung-Jin Uhm, Seoul (KR); Seong-Hwan Han, Seongnam-si (KR); Kwang-Deog Jung, Seoul (KR); Seong-Hoon Cho, Seoul (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 09/518,162

(22) Filed: Feb. 17, 2000

Related U.S. Application Data

(63) Continuation-in-part of application No. 09/029,620, filed as application No. PCT/KR96/00149 on Aug. 28, 1996, now abandoned.

(30) Foreign Application Priority Data

Sep. 29, 1995 (KR) ............................................. 95-27099

(51) Int. Cl.⁷ .................................................. C02F 1/72
(52) U.S. Cl. ........................ 210/759; 210/760; 210/763; 210/908
(58) Field of Search ................................ 210/758, 759, 210/760, 762, 763, 908, 909

(56) References Cited

U.S. PATENT DOCUMENTS

| | | | | |
|---|---|---|---|---|
| 4,764,286 A | * | 8/1988 | Bon et al. ................... | 210/763 |
| 4,879,047 A | * | 11/1989 | Jackson ...................... | 210/756 |
| 5,037,791 A | * | 8/1991 | Comolli et al. ............. | 502/185 |
| 5,057,220 A | * | 10/1991 | Harada et al. .............. | 210/605 |
| 5,120,453 A | * | 6/1992 | Frame et al. ............... | 210/763 |
| 5,192,452 A | * | 3/1993 | Mitsui et al. ............... | 210/760 |
| 5,338,463 A | * | 8/1994 | Yan ............................. | 210/763 |
| 5,635,076 A | * | 6/1997 | Bremer et al. ............. | 210/750 |
| 5,643,466 A | * | 7/1997 | Strapp ........................ | 210/763 |
| 5,772,897 A | * | 6/1998 | Hancock ..................... | 210/756 |
| 5,779,915 A | * | 7/1998 | Becker et al. .............. | 210/757 |
| 6,403,031 B1 | * | 6/2002 | Escude et al. ................ | 422/28 |

FOREIGN PATENT DOCUMENTS

| | | | |
|---|---|---|---|
| FR | 2771728 A1 | * | 6/1999 |
| JP | 62-132592 A | * | 6/1987 |
| WO | WO-95/26318 | * | 10/1995 |

* cited by examiner

Primary Examiner—David A. Simmons
Assistant Examiner—Frank M. Lawrence
(74) Attorney, Agent, or Firm—Anderson Kill & Olick, PC

(57) ABSTRACT

Wastewater streams containing various pollutants are economically and efficiently treated at ambient temperature and pressure with hydrogen peroxide, oxygen or ozone in the presence of a heterogeneous catalyst comprising an element selected from the group consisting of Ni, Ru, Co, Fe, Cu, Mn, Li and a mixture thereof supported on a metal oxide selected from the group consisting of MgO, CaO, $SnO_2$, PbO and a mixture thereof.

4 Claims, No Drawings

WASTEWATER TREATMENT BY CATALYTIC OXIDATION

CROSS REFERENCE TO RELATED APPLICATION

This application is a continuation-in-part application of U.S. Ser. No. 09/029,620 filed on Feb. 27, 1998, now abandoned which is a 371 of PCT/KR96/00149, filed Aug. 28, 1996, and claims priority thereon pursuant to 35 U.S.C. 120.

FIELD OF THE INVENTION

The present invention relates to an oxidative wastewater treatment process using a catalyst under a mild condition; and to the catalyst suitable for use in said treatment.

BACKGROUND OF THE INVENTION

Industrial wastewaters generated at various plants often comprise toxic pollutants which cannot be removed by a simple biological process based on activated-sludge treatment. They are therefore treated, e.g., by a chemical process, either alone or in combination with a biological treatment process, to meet the discharge criteria of the effluent.

A chemical wastewater treatment process uses a chemical reagent that may oxidize, reduce, complexe or hydrolyse polluting materials present in the wastewater and a typical conventional chemical treatment method uses an oxidizing agent, e.g., hydrogen peroxide, ozone, permanganates, hypochlorites and the like. However, this conventional oxidative process suffers from the problem that the reactivities of the oxidizing agents with the pollutants are such that a severe reaction condition, i.e., a high temperature/pressure condition is usually required. Moreover, the conventional oxidative processes have additional problems, e.g, in the alkaline chlorination method for removing cyanides from waste water, chlorine may react with other components in the waste water to produce chlorinated compounds which may be toxic and not easy to remove. Accordingly, there have been a number of efforts to develop methods which are not hampered by such problems. For example, a catalytic method to oxidatively remove toxic pollutants from waste water at 250° C. and 10 to 70 atm was reported in *Jpn. Catalyst*, 35(5), 289 (1993). However, this method employs a severe condition, and is thus not economical.

Further, a method to increase the reactivity of the pollutants by irradiating UV together with an oxidizing agent has recently been developed (see Ollis. D. F., *Environ. Sci. Technol.* 26, 313, 1992). However, this method also requires a high treatment cost.

Furthermore, U.S. Pat. No. 5,192,452 discloses a method for the waste treatment by the use of a catalyst comprising a first component selected from the oxides of titanium, silicon, aluminum and zirconium and a second component selected from Mn, Fe, Co, Ni, Ce, W, Cu, Ag, Au, Pt, Pd, Rd, Ru and Ir, or a sparingly water-soluble compound of the metal, with ozone, for the purpose of deodorization, sterilization and decolorization. However, the catalyst used in this method has a relatively low activity.

Accordingly, there has existed a need to develop a catalytic process which is more effective in oxidizing pollutants in wastewater under a mild condition, e.g., at ambient temperature and pressure.

SUMMARY OF THE INVENTION

It is, therefore, a primary object of the invention to provide an efficient catalytic process for treating wastewater with an oxidizing agent under a mild condition.

It is another object of the invention to provide a heterogeneous catalyst suitable for use in said catalytic process.

In accordance with an aspect of the present invention, there is provided a catalytic process for treating a wastewater stream with hydrogen peroxide, air, oxygen or ozone at ambient temperature and pressure.

In accordance with another aspect of the present invention, there is provided a catalyst for oxidative wastewater treatment, which comprises an element selected from the group consisting of transition metals, alkali metals, alkaline earth metals and a mixture thereof supported on the specified metal oxide.

DETAILED DESCRIPTION OF THE INVENTION

In accordance with the present invention, an industrial wastewater containing various toxic pollutants can be treated economically and efficiently by way of using an oxidizing agent in the presence of a specified catalyst under a mild condition, e.g., at ambient temperature and pressure.

The process of the present invention is suitable for treating industrial wastewaters generated in petrochemical and refinery processes; coal chemical processes; and other processes to make agricultural chemicals, polymers, dyes, glasses, electric and electronic articles, paper products, textiles, machines and synthetic leathers; and the like.

Representatives of the compounds to be removed from industrial wastewaters in accordance with the present invention may include: phenolic compounds, e.g., phenol, monochlorophenol, dichlorophenol, trichlorophenol, tetrachlorophenol and pentachlorophenol; chlorinated aliphatic compounds, e.g., chloroform, carbon tetrachloride, 1,2-dichloroethane, 1,1,1-trichloroethane, tetrachloroethane, 1,2-dichloroethylene, trichloroethylene and perchloroethylene; benzene and chlorinated benzenes, e.g., monochlorobenzene, dichlorobenzene, trichlorobenzene, tetrachlorobenzene and hexachlorobenzene; alcohols, e.g., methanol, ethanol, propanol, butanol, pentanol, hexanol and cresol; toluene; xylene; acetonitrile; dipropylformamide; mercaptans; methylethylketone; nitrobenzene; organic phosphor compounds; phthalimides; quinolines; cyanides; and the like.

Representatives of the oxidizing agent which may be used in the present invention include air, oxygen, hydrogen peroxide, $N_2O$ and ozone, among which air and oxygen are preferred. The oxidizing agent may be employed in an amount suitable for lowering the COD (chemical oxygen demand) value of the waste water to a desired level.

The oxidation is preferably carried out in an aqueous solution, although an organic solvent may also be employed for a specific purpose, e.g., for a selective oxidation. When air or oxygen is employed as the oxidizing agent, it is preferable to conduct the oxidation at an operating pressure of 5 atm or higher.

In accordance with the present invention, a heterogeneous catalyst is employed together with an oxidizing agent. The catalyst is prepared by impregnating a support material with an aqueous or organic solution containing a metallic element selected from the group consisting of transition metals, alkali metals, alkaline earth metals and a mixture thereof.

The metallic element suitable for use in preparing the inventive catalyst may be Group IA elements such as Li, Na and K, Group VIII elements such as Ru, Co, Fe, Pt, Pd, Ni, Co and Rh, Group VII elements such as Mn, Group IB elements such as Cu and a mixture thereof; preferably, Ru, Co, Fe, Cu, Mn and a mixture thereof. The metallic element may be in a form soluble in water or in an organic solvent, and a chloride or nitrate thereof may be employed in an amount ranging from 0.0001 to 100% by weight; more preferably 0.01 to 50% by weight; and most preferably 0.1 to 10% by weight, based on the amount of the supporting material used.

The support material may be an oxide of Mg, Ca, Sr, Ba, Ge, Sn, Pb, a Lanthanoid element, an Actinoid element or a mixture thereof. Preferably, the support is MgO, CaO, BaO, PbO, $SnO_2$ or a mixture thereof.

The preferred catalyst is a transition metal catalyst supported on MgO, and the most preferred catalyst is Fe/MgO.

The catalyst of the present invention may be prepared from the material impregnated in accordance with the embodiment of this invention as described above by drying and calcining at a temperature ranging from 200 to 600° C., preferably 400° C. for a period ranging from 0.1 to 24 hours, preferably 2 hours. The catalyst may be in the form of powders, pellets or granules. In the present invention, the waste water is preferably treated at a flow rate ranging from 0.001 to 1,000 LHSV (liquid hourly space velocity: volumes of the waste water fed per hour per unit volume of the catalyst).

The wastewater treatment process of this invention may be practiced by using any one of the known reactor systems, e.g., a fixed bed reactor, a fluidized bed reactor, a slurry reactor and others. If necessary, the catalyst may be recovered from the reactor, regenerated by drying and calcination, and recycled.

The reactivity of the catalyst of the present invention generally increases as the pH of the wastewater decreases. However, since the active ingredient of the catalyst may be leached out at a strongly acidic condition, the pH of the wastewater may preferably be adjusted to 3 or higher, more preferably to 6 or higher.

It is an important characteristic of the present invention that the wastewater treatment can be conducted effectively at ambient temperature and pressure, although the inventive process may be made more effective by conducting the inventive wastewater treatment at a higher temperature as the process allows. The inventive process may be preferably conducted at a temperature below 100° C., more preferably below 50° C.

The following Examples are given for the purpose of illustration only and are not intended to limit the scope of the invention.

EXAMPLE 1

Preparation of Catalysts

A Ru/MgO catalyst of the present invention was prepared by dissolving 0.21 g of $RuCl_3$ in 50 ml of water, impregnating 10 g of MgO (325 mesh) with the resulting solution, drying the resulting material and calcining at 400° C. for 2 hours to obtain the catalyst having a Ru loading of 1 wt % based on the total composition.

A similar procedure was repeated using other metal chlorides or nitrates together with appropriate metal oxide supports to prepare Fe/MgO, Li/MgO, Co/MgO, Co/Li/MgO, Cu/MgO, Pd/MgO, Cu-Fe/MgO, Mn/MgO, Mo/MgO, Cu-Fe-Mn/MgO, Fe/PbO, Li/PbO, Co/PbO, Co/Li/PbO, Ru/PbO, Mn/CaO, V/CaO, Cr/CaO, Fe/$SnO_2$, Ni/$SnO_2$, Fe/$TiO_2$, Fe-Cu/$TiO_2$, Cu/$TiO_2$, Mn/$TiO_2$, V/$TiO_2$, Fe-Cu-Mn/$TiO_2$, Fe/$ZrO_2$, Cu/$ZrO_2$, Cu-Fe/$ZrO_2$, Mn/$ZrO_2$ and Cu-Fe-Mn/$ZrO_2$ catalysts, respectively.

EXAMPLE 2

$H_2O_2$ Treatment of Wastewater Generated in a Dye Making Process

In a fluidized bed reactor, a wastewater stream generated in a dye making process was continuously treated with hydrogen peroxide at 20° C. and 1 atm in the presence of 2 wt % Fe/MgO catalyst prepared in Example 1, wherein the hydrogen peroxide concentration was 1 g/L and the pH of the waste water was in the range of 10 to 11. The above procedure was repeated using other catalysts listed in Table 1.

The COD value of the wastewater before the treatment was 6,000 ppm. The COD values of the treated wastewater were determined at various LHSV, and the results are shown in Table 1.

TABLE 1

| | LHSV of Wastewater | | (unit:ppm) |
|---|---|---|---|
| Catalyst | 7 | 10 | 12 |
| 2% Fe/MgO | 3321 | 3380 | 3477 |
| 2% Cu-2% Fe/MgO | 2823 | 2845 | 2726 |
| 2% Cu/MgO | 2795 | 2934 | 2726 |
| 2% Mn/MgO | 3141 | 3188 | 3224 |
| 2% Fe-2% Cu-2% Mn/MgO | 3181 | 3236 | 3257 |
| 2% Fe/$TiO_2$ | 4323 | 4716 | 4777 |
| 2% Fe-2% Cu/$TiO_2$ | 4701 | 4808 | 4883 |
| 2% Cu/$TiO_2$ | 4747 | 4792 | 4838 |
| 2% Mn/$TiO_2$ | 4807 | 4845 | 4898 |
| 2% Fe-2% Cu-2% Mn/$TiO_2$ | 4089 | 4588 | 4762 |
| 2% Fe/$ZrO_2$ | 4145 | 4507 | 4767 |
| 2% Cu-2% Fe/$ZrO_2$ | 4709 | 4746 | 4745 |
| 2% Cu/$ZrO_2$ | 4810 | 4702 | 4810 |
| 2% Mn/$ZrO_2$ | 4155 | 4336 | 4690 |
| 2% Cu-2% Fe-2% Mn/$ZrO_2$ | 3657 | 4095 | 4290 |

EXAMPLE 3

$O_2$ Treatment of Wastewater Generated in a Dye Making Process

The procedure described in Example 2 was repeated except that oxygen was employed in place of hydrogen peroxide; i.e., an oxygen gas stream was introduced to the reactor at GHSV of 5 under 1 atm.

The COD value of the wastewater before the treatment was 4,500 ppm, and the results for the COD measurement of the treated wastewater are shown in Table 2.

TABLE 2

| | LHSV of Wastewater | | (unit:ppm) |
|---|---|---|---|
| Catalyst | 7 | 10 | 12 |
| 2% Fe/MgO | 3025 | 3186 | 3025 |
| 2% Cu-2% Fe/MgO | 3059 | 3202 | 3188 |
| 2% Cu/MgO | 3459 | 3463 | 3459 |
| 2% Mn/MgO | 2979 | 2948 | 2906 |
| 2% Fe-2% Cu-2% Mn/MgO | 3012 | 3083 | 3112 |

EXAMPLE 4

Treatment of Wastewater Generated in a Dye Making Process

The procedure described in Example 3 was repeated except that catalysts having 1 wt % metallic loading were employed.

The COD value of the wastewater before the treatment was 4,500 ppm, and the results for the COD measurement of the treated wastewater are shown in Table 3.

TABLE 3

| | LHSV of Wastewater (unit:ppm) | | |
|---|---|---|---|
| Catalyst | 7 | 10 | 12 |
| 1% Fe/MgO | 3267 | 3186 | 3025 |
| 1% Cu-1% Fe/MgO | 3354 | 3290 | 3300 |
| 1% Cu/MgO | 3329 | 3385 | 3310 |
| 1% Mn/MgO | 3090 | 3099 | 3133 |
| 1% Fe-1% Cu-1% Mn/MgO | 3071 | 3299 | 3310 |

EXAMPLE 5

Treatment of Wastewater Generated in a Dye Making Process

The procedure of Example 3 was repeated using 3% Fe/MgO and 3% Cu/MgO.

The COD value of the wastewater before the treatment was 4,500 ppm, and the results for the COD measurement of the treated wastewater are shown in Table 4.

TABLE 4

| | LHSV of Wastewater (unit:ppm) | | |
|---|---|---|---|
| Catalyst | 7 | 10 | 12 |
| 3% Fe/MgO | 3183 | 3226 | 3186 |
| 3% Cu/MgO | 3422 | 3901 | 3868 |

EXAMPLE 6

Treatment of Wastewater Generated in a Dye Making Process

The procedure described in Example 2 was repeated except that hydrogen peroxide was employed at a concentration of 0.35 g/L.

The COD value of the wastewater before the treatment was 600 ppm, and the results for the COD measurement of the treated wastewater are shown in Table 5.

TABLE 5

| | LHSV of Wastewater (unit:ppm) | | |
|---|---|---|---|
| Catalyst | 7 | 10 | 12 |
| 2% Fe/MgO | 102 | 106 | 110 |
| 2% Cu-2% Fe/MgO | 105 | 101 | 120 |
| 2% Cu/MgO | 99 | 101 | 120 |
| 2% Mn/MgO | 105 | 111 | 125 |
| 2% Fe-2% Cu-2% Mn/MgO | 113 | 112 | 123 |

EXAMPLE 7

Ozone Treatment of Waste Water Generated in a Dye Making Process

The procedure described in Example 2 was repeated except that ozone was employed in place of hydrogen peroxide as the oxidizing agent. Ozone was introduced to the reactor using bubbler.

The COD value of the wastewater before the treatment was 5,000 ppm, and the results for the COD measurement of the treated wastewater are shown in Table 6.

TABLE 6

| | LHSV of Wastewater (unit:ppm) | | |
|---|---|---|---|
| Catalyst | 7 | 10 | 12 |
| 2% Fe/MgO | 2939 | 3056 | 3001 |
| 2% Cu-2% Fe/MgO | 2960 | 3129 | 3103 |
| 2% Cu/MgO | 3221 | 3224 | 3150 |
| 2% Mn/MgO | 3546 | 3621 | 3904 |
| 2% Fe-2% Cu-2% Mn/MgO | 3427 | 3550 | 3700 |

As clearly seen from above, the dye making wastewater streams can be effectively treated under an ambient condition by the inventive catalytic oxidation process, to reduce the amount of pollutants at a high rate.

EXAMPLE 8

$H_2O_2$ Treatment of Cyanide Ion

In a 1 L of stirred batch reactor, 0.5 L of aqueous solution containing 300 ppm of cyanide ions obtained by dissolving KCN in water was treated with 0.84 ml of 35% hydrogen peroxide at 20° C. and 1 atm in the presence of 0.5 g of the Ru/MgO catalyst prepared in Example 1. In this treatment, the amount of hydrogen peroxide employed was 1.5 mole per mole of cyanide ion, the amount of the catalyst corresponded to 0.5 g/L, and the pH of the wastewater was 10. The above procedure was repeated using other catalysts listed in Table 1 and also in the absence of a catalyst.

The cyanide concentration in the wastewater was determined at the beginning of the treatment and 5 minutes after the treatment, and the results are shown in Table 7.

TABLE 7

| Catalyst | Ru/MgO | Fe/MgO | Co/Li/MgO | Ru/PbO | No Catalyst |
|---|---|---|---|---|---|
| $C_t/C_i$ | 0.35 | 0.30 | 0.30 | 0.30 | 0.90 |

$C_i$: A concentration of cyanide ion n wastewater at the beginning of the treatment $C_t$: A concentration of cyanide ion in wastewater at 5 minutes after the treatment

EXAMPLE 9

$O_2$ Treatment of Cyanide Ion

The procedure described in Example 2 was repeated except that $O_2$ was employed as an oxidizing agent, and the results for the COD measurement are shown in Table 8.

TABLE 8

| Catalyst | Fe/MgO | Co/Li/MgO | Mn/CaO | No Catalyst |
|---|---|---|---|---|
| $C_t/C_i$ | 0.32 | 0.29 | 0.34 | 1.0 |

$C_i$: concentration of cyanide ion in wastewater at the beginning of the treatment $C_t$: A concentration of cyanide ion in wastewater at 5 minutes after the treatment

EXAMPLE 10

Ozone Treatment of Cyanide Ion

The procedure described in Example 8 was repeated except that ozone was employed as an oxidizing agent, and the results for the COD measurement are shown in Table 9.

TABLE 9

| Catalyst | Fe/MgO | Co/Li/MgO | Mn/CaO | No Catalyst |
|---|---|---|---|---|
| $C_f/C_i$ | 0.28 | 0.27 | 0.30 | 0.90 |

$C_i$: A concentration of cyanide ion in wastewater at the beginning of the treatment $C_f$: A concentration of cyanide ion in wastewater at 5 minutes after the treatment As can be seen from the above Tables 7 to 9, the oxidation reaction proceeded very slowly when no catalyst was employed. Whereas, when the catalysts according to the present invention were employed, the oxidative removal of the cyanide ion progressed rapidly; more than 65% of the cyanide ion was removed in 5 minutes.

EXAMPLE 11

$H_2O_2$ Treatment of Wastewater Generated in a Synthetic Leather Making Process A wastewater sample collected from a synthetic leather making process was treated in accordance with the procedure described in Example 8 using various catalysts listed in Table 10 except that the pH of the wastewater was controlled to 7.

The COD value of the wastewater was determined at the beginning and 1 hour after the treatment according to the Cr method described by Eds. Lenore et al. in "Standard Method for the Examination of Water and Waste Water," American Public Health Association, P5-10 to P5-16. The results are shown in Table 10.

TABLE 10

| Catalyst | No Catalyst | Li/MgO | Co/MgO | Co/Li/MgO | Ru/MgO |
|---|---|---|---|---|---|
| $C_f/C_i$ | 0.85 | 0.48 | 0.57 | 0.48 | 0.46 |

| Catalyst | Fe/PbO | Li/PbO | Co/PbO | Co/Li/PbO | Ru/PbO |
|---|---|---|---|---|---|
| $C_f C_i$ | 0.51 | 0.50 | 0.48 | 0.46 | 0.49 |

$C_f$: A COD value of the wastewater at 1 hour after the treatment $C_i$: A COD value of the wastewater at the beginning of the treatment

EXAMPLE 12

$O_2$ Treatment of Wastewater Generated in a Synthetic Leather Making Process

The process described in Example 11 was repeated except that $O_2$ was employed as an oxidizing agent, and the results for the COD measurement are shown in Table 11.

TABLE 11

| Catalyst | No Catalyst | Li/MgO | Fe/MgO | Co/Li/MgO |
|---|---|---|---|---|
| $C_f/C_i$ | 1.0 | 0.55 | 0.45 | 0.48 |
| Catalyst | Fe/PbO | Ni/SnO$_2$ | Mn/MgO | V/CaO |
| $C_f/C_i$ | 0.64 | 0.60 | 0.52 | 0.65 |

$C_f$: A COD value of the wastewater at 1 hour after the treatment $C_i$: A COD value of the wastewater at the beginning of the treatment

EXAMPLE 13

Ozone treatment of Wastewater Generated in a Synthetic Leather Making Process

The process described in Example 11 was repeated except that ozone was employed as an oxidizing agent, and the results for the COD measurement are shown in Table 12.

TABLE 12

| Catalyst | No Catalyst | Mo/MgO | Fe/MgO | Co/Li/MgO |
|---|---|---|---|---|
| $C_f/C_i$ | 0.9 | 0.68 | 0.40 | 0.45 |
| Catalyst | Fe/PbO | Ni/SnO$_2$ | Mn/MgO | |
| $C_f/C_i$ | 0.60 | 0.55 | 0.50 | |

$C_f$: A COD value of the wastewater at 1 hour after the treatment $C_i$: A COD value of the wastewater at the beginning of the treatment As can be seen from the above Tables 10 to 12, the oxidation treatment without catalyst reduces the COD value only by 15%, whereas the inventive catalytic oxidation can reduce the COD value by about 50% in an hour.

EXAMPLE 14

$H_2O_2$ treatment of phenol

An aqueous solution containing 250 ppm of phenol was treated in accordance with the procedure described in Example 11, and the results for the COD measurement are shown in Table 13.

TABLE 13

| Catalyst | No Catalyst | Co/MgO | Fe/MgO | Ru/MgO | — |
|---|---|---|---|---|---|
| $C_f/C_i$ | 0.97 | 0.8 | 0.8 | 0.72 | — |
| Catalyst | Fe/PbO | Li/PbO | Co/PbO | Co/Li/PbO | Ru/PbO |
| $C_f/C_i$ | 0.78 | 0.81 | 0.75 | 0.71 | 0.68 |

$C_f$: A COD value of the wastewater at 1 hour after the treatment $C_i$: A COD value of the wastewater at the beginning of the treatment

EXAMPLE 15

$O_2$ Treatment of Phenol

The process described in Example 14 was repeated except that $O_2$ was employed as an oxidizing agent, and the results for the COD measurement are shown in Table 14.

TABLE 14

| Catalyst | No Catalyst | Mo/MgO | Fe/MgO | Co/Li/MgO |
|---|---|---|---|---|
| $C_t/C_i$ | 1.0 | 0.81 | 0.70 | 0.75 |
| Catalyst | Fe/PbO | Fe/SnO$_2$ | Cu/MgO | Cr/CaO |
| $C_t/C_i$ | 0.80 | 0.85 | 0.75 | 0.85 |

$C_t$: A COD value of the wastewater at 1 hour after the treatment $C_i$: A COD value of the wastewater at the beginning of the treatment

EXAMPLE 16

Ozone Treatment of Phenol

The process of Example 14 was repeated except that ozone was employed as an oxidizing agent, and the results for the COD measurement are shown in Table 15.

TABLE 15

| Catalyst | No Catalyst | Pd/MgO | Fe/MgO | Co/Li/MgO |
|---|---|---|---|---|
| $C_t/C_i$ | 0.98 | 0.70 | 0.65 | 0.70 |
| Catalyst | Fe/PbO | Fe/SnO$_2$ | Cu/MgO | Cr/CaO |
| $C_t/C_i$ | 0.75 | 0.70 | 0.70 | 0.85 |

$C_t$: A COD value of the wastewater at 1 hour after the treatment $C_i$: A COD value of the wastewater at the beginning of the treatment As can be seen from the above Tables 13 to 15, the reaction of phenol with the oxidizing agent does not occur to any significant extent when no catalyst is present. In contrast, when one of the catalysts according to the present invention was employed, the COD value of the waste water was decreased by about 20 to 30% in an hour.

As clearly seen from above, various wastewater streams can be effectively treated under an ambient condition by the catalytic oxidation process of this invention.

While the invention has been described in connection with the above specific embodiments, it should be recognized that various modifications and changes may be made to the invention by those skilled in the art without departing from the scope of the invention as defined by the appended claims.

What is claimed is:

1. A process for treating a wastewater stream to remove an oxidizable pollutant therefrom, which comprises bringing the wastewater stream into contact with hydrogen peroxide, oxygen or ozone in the presence of a catalyst at a temperature of 100° C. or below and under a pressure of 5 atm or below, the catalyst comprising a support material selected from the group consisting of MgO, CaO, SnO$_2$, PbO and a mixture thereof, and Fe as a metallic element.

2. The process of claim 1 wherein the process is conducted at an ambient temperature and pressure.

3. The process of claim 1 wherein the oxidizable pollutant is a compound selected from the group consisting of phenolic compounds, halogenated aliphatic compounds, halogenated aromatic compounds, nitrated aromatic compounds, aromatic heterocyclic compounds, nitrites, amides, mercaptans, ketones, ureas, imides, organic phosphor compounds, cyanides and a mixture thereof.

4. The process of claim 1 wherein the support material is MgO.

* * * * *